(12) United States Patent
Goldberg

(10) Patent No.: US 7,236,808 B2
(45) Date of Patent: Jun. 26, 2007

(54) VERTICAL DYNAMIC BEAM-FORMING

(75) Inventor: Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 170 days.

(21) Appl. No.: 10/656,495

(22) Filed: Sep. 5, 2003

(65) Prior Publication Data

US 2004/0048635 A1    Mar. 11, 2004

Related U.S. Application Data

(60) Provisional application No. 60/409,972, filed on Sep. 9, 2002.

(51) Int. Cl.
*H04M 1/00* (2006.01)

(52) U.S. Cl. .................. 455/562.1; 455/561; 455/272; 455/276.1; 455/440; 455/279.1

(58) Field of Classification Search ............ 455/562.1, 455/561, 422.1, 466, 550.1, 276.1, 272, 440, 455/404.1, 404.2; 342/374
See application file for complete search history.

(56) References Cited

U.S. PATENT DOCUMENTS

| | | | |
|---|---|---|---|
| 3,987,454 A | 10/1976 | Epis | |
| 4,249,181 A | 2/1981 | Lee | |
| 5,666,123 A | 9/1997 | Chrystie | |
| 5,686,926 A | 11/1997 | Kijima et al. | |
| 5,771,017 A * | 6/1998 | Dean et al. | 342/374 |
| 5,818,385 A | 10/1998 | Bartholomew | |
| 5,887,262 A | 3/1999 | Willhoff | |
| 6,016,123 A * | 1/2000 | Barton et al. | 342/373 |
| 6,104,936 A | 8/2000 | Kronestedt | |
| 6,282,434 B1 | 8/2001 | Johannisson et al. | |
| 6,311,075 B1 | 10/2001 | Bevan et al. | |
| 6,597,927 B1 * | 7/2003 | Eswara et al. | 455/562.1 |
| 6,697,642 B1 * | 2/2004 | Thomas | 455/562.1 |
| 6,889,061 B2 * | 5/2005 | Shapira et al. | 455/562.1 |
| 2001/0051532 A1 | 12/2001 | Voyer | |
| 2002/0058503 A1 | 5/2002 | Gutowski | |
| 2002/0065107 A1 | 5/2002 | Harel et al. | |
| 2002/0098872 A1 | 7/2002 | Judson | |

(Continued)

FOREIGN PATENT DOCUMENTS

WO    02/15326    2/2002

(Continued)

OTHER PUBLICATIONS

WO 02/15326 A2 (Shapira, Joseph, Optimizing clever antenna by beam tilting, Feb. 21, 2002.*

(Continued)

*Primary Examiner*—Joseph Feild
*Assistant Examiner*—Khai Nguyen
(74) *Attorney, Agent, or Firm*—Volpe and Koenig, P.C.

(57) ABSTRACT

A wireless communication system for transmitting and receiving wireless communications using at least one beam is disclosed. The system comprises a plurality of WTRUs, at least one beam-forming antenna, and at least one radio network controller (RNC). The antenna is capable of beam-forming and beams emanating from the antenna may be adjusted in accordance with actual conditions in the wireless communication system.

16 Claims, 7 Drawing Sheets

U.S. PATENT DOCUMENTS

| | | | |
|---|---|---|---|
| 2004/0005870 A1* | 1/2004 | Yla-Jaaski et al. | 455/265 |
| 2004/0063467 A1* | 4/2004 | Shapira et al. | 455/561 |
| 2004/0106437 A1* | 6/2004 | Ylitalo | 455/562.1 |
| 2004/0258019 A1* | 12/2004 | Haumont et al. | 370/331 |
| 2005/0130693 A1* | 6/2005 | Malladi et al. | 455/522 |

FOREIGN PATENT DOCUMENTS

WO      WO 02/15326 A2 * 2/2002

OTHER PUBLICATIONS

Shapira, Joseph (WO 02/15326 A2) Optimizing clever antenna by beam tilting, Feb. 21, 2002.*

Kishino Yasuhiro (Japan-2000-124720) Radio communication device, Dec. 10, 1998.*

Shapira, Joseph (W.O 02/15326) Feb. 21, 2002, Optimizing clever antenna by beam tilting.*

TSG-RAN Meeting #14, Kyoto, Japan, Dec. 11-14, 2001, RP-010834.

TSG-RAN Meeting #15, Jeju-do, Korea, Mar. 5-8, 2002. RP-020005.

TSG-RAN Meeting #16, Marco Island, FL, USA, Jun. 4-7, 2002, RP-020266.

TSG-RAN Working Group 3, Sophia Antipolis, France, Jun. 24-28, 2002, TSGR3#30(02) 1703, Minutes of WG3 Meeting #29, Gyeongju, Korea, May 13-17, 2002.

"Control interface for antenna line devices," Antenna Interface Standards Group, Standard No. AISG1: Draft 8, (1$^{st}$ Public Draft), Nov. 18, 2002, pp. 1-54.

TSG-RAN Meeting #19, Biringham, United Kingdom, Mar. 11-14, 2003, RP-030022.

TSG-RAN Meeting #14, Kyoto, Japan, Dec. 11-14, 2001, RP-010834.

TSG-RAN Meeting #15, Jeju-do, Korea, Mar. 5-8, 2002. RP-020005.

TSG-RAN Meeting #16, Marco Island, FL, USA, Jun. 4-7, 2002, RP-020266.

TSG-RAN Working Group 3, Sophia Antipolis, France, Jun. 24-28, 2002, TSGR3#30(02) 1703, Minutes of WG3 Meeting #29, Gyeongju, Korea, May 13-17, 2002.

"Control interface for antenna line devices" Antenna Interface Standards Group, Standard No. AISG1: Draft 8, (1$^{st}$ Public Draft), Nov. 18, 2002, pp. 1-54.

TSG-RAN Meeting #19, Biringham, United Kingdom, Mar. 11-14, 2003, RP-030022.

* cited by examiner

TERRAIN ADAPTION

VERTICAL BEAM ADJUSTED TO REACH WTRU WITH MINIMUM
TRANSMITTER POWER/MINIMUM RECEIVER INTERFERENCE

VERTICAL DYNAMIC BEAM-FORMING

CROSS REFERENCE TO RELATED APPLICATION(S)

This application claims priority from U.S. Provisional Application No. 60/409,972, filed on Sep. 9, 2002, which is incorporated by reference as if fully set forth.

FIELD OF INVENTION

This invention generally relates to beam-forming in wireless communications, and more particularly to improved beam-forming techniques so as to achieve an improved signal to noise (S/N) ratio between wireless transmit/receive units (WTRUs) and Node Bs in both uplink and downlink transmissions.

BACKGROUND

Wireless communication systems are well known in the art. A typical wireless communication system in accordance with current 3GPP specifications is depicted in FIG. 1. By way of example, the network architecture shown in FIG. 1 is that of UMTS. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit/receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with WTRUs. One or more Node Bs are connected to each RNC via an interface known as Iub in 3GPP. The UTRAN may have several groups of Node Bs connected to different RNCs, two are shown in the example depicted in FIG. 1. Where more than one RNC is provided in a UTRAN, inter-RNC communication is performed via an Iur interface. Communications external to the network components are performed by the Node Bs on a user level via the Uu interface and the CN on a network level via various CN connections to external systems.

In general, the primary function of Node Bs is to provide a radio connection between the Node Bs' network and the WTRUs. Typically a Node B emits common channel signals allowing non-connected WTRUs to become synchronized with the Node B's timing. In 3GPP, a Node B performs the physical radio connection with the WTRUs. The Node B receives signals over the Iub interface from the RNC that control the radio signals transmitted by the Node B over the Uu interface.

A CN is responsible for routing information to its correct destination. For example, the CN may route voice traffic from a WTRU that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provide intermediary services for communications having a local component via a Uu interface connection with a Node B and an external service component via a connection between the CN and an external system, for example overseas calls made from a WTRU in a domestic UMTS.

Typically, an RNC oversees multiple Node Bs, manages radio resources within the geographic area of wireless radio service coverage serviced by the Node Bs, and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

An RNC has several logical roles depending on the CN's needs. Generally, these functions are divided into two components: a serving RNC (S-RNC) and a controlling RNC (C-RNC). As a serving RNC (S-RNC), the RNC functions as a bridge to the CN and the Node Bs. As a controlling RNC (C-RNC), the RNC is responsible for the configuration of a Node B's hardware. The C-RNC also controls data transfers and handles congestion between different Node Bs. A third logical role of an RNC is as a Drift-RNC. As a Drift-RNC, the RNC is responsible for handing off the WTRU to another Node B as the WTRU traverses the coverage area.

The RNCs and the Node Bs together perform radio resource management (RRM) operations, such as "inner loop power control." This is a feature to prevent near-far problems. Generally, for example, if several WRTUs transmit at the same power level, the WRTUs closest to a Node B may drown the signals from the WRTUs that are farther away. The Node B checks the power received from the different WRTUs and transmits commands to the WRTUs to reduce or increase power until the Node B receives the power from each WRTU at about the same level.

Conventionally, a Node B will provide wireless communication for many WTRUs. Node Bs will typically handle multiple communications with subscriber systems concurrently. One measure of Node B capacity is the maximum number of concurrent communications it can support which is a factor determined by such things as available power and bandwidth.

Since not all subscribers communicate with the Node B at the same time, a Node B can provide wireless service to a great many subscribers beyond its capacity for concurrent communications. If the maximum number of concurrent communications for a Node B is being conducted, an attempt to establish a further communication will result in an indication of service unavailability, such as a system busy signal.

Service coverage by a Node B is not only limited to its capacity for handling concurrent communications, but is also inherently limited to a specific geographic area. A Node B's geographic range is typically defined by the location of the Node B's antenna system and the power of the signal broadcast by the Node B.

In order to provide wireless service over an expansive geographic area, a network system is conventionally provided with multiple Node Bs. Each Node B has its antenna system selectively physically located to provide coverage over a specific portion of the total geographic area which is covered by the system. Such systems readily provide wireless service for WTRUs which can travel out of the range of one Node B and into the range of another Node B without interruption of an ongoing wireless communication. In such networks, the geographic area covered by a Node B is commonly referred to as a cell and the telephone communication services provided are commonly called cellular telephone services.

In designing a wireless communication system to cover a specific geographic area, the geographic area may be partitioned into a predefined pattern of cells. For example as illustrated in FIG. 2A, hexagonal-shape cells can be defined so that the cells cover the entire geographic area in a honeycomb pattern. In such a system, each cell can have a Node B which has an antenna at the center of the cell to provide 360° coverage. Although a map of cell coverage may be designed without any overlapping areas, in practice as shown in FIG. 2B, the transmission beams, shown in phantom, from Node B antennas of adjacent cells do overlap. This overlap of beam coverage enables "handover" of a communication being conducted by a WTRU from one Node B to another as the WTRU travels from one cell to another. However, an overlapping Node B signal contributes to interference of a signal received by a WTRU from a different Node B when the WTRU is located in the overlap area.

To more readily meet service demands and reduce interference, beam-forming may be used. Beam-forming in communications is a very useful tool, and is implemented by using an array of antennas for transmission, reception or both, in such a manner that will best match the channel requirements. The phase and amplitude of the signals in each antenna are precisely controlled so as to obtain a constructive pattern at the receiver.

Known methods of beam-forming have addressed adjustment of the beams in the horizontal direction. Additionally, in prior art, transmission-power adjustment or deployment of wide vertical beams for receiving signals have been used to match the channel requirements. This technique helps to cope with severe multipath situations and overcomes extra attenuation by providing extra effective power concentration. Beam-forming has also been utilized in handling interference from other transmission sources.

Although beam forming provides many benefits, present implementations cause various issues that need to be addressed. By way of example, present implementations of beam-forming suffer from the beams intruding on adjoining cells. The intrusion can be to/from a neighboring cell and is sometimes especially pronounced if the beam-forming includes a broad vertical beam component to reach WTRUs. Furthermore, objects, terrain, etc. also interfere with the vertical component of wide beams.

It is therefore desirable to obviate the disadvantages encountered in known implementations of beam-forming.

SUMMARY

The present invention is a wireless communication system for transmitting and receiving wireless communications using at least one beam. The system comprises a plurality of WTRUs, at least one beam-forming antenna, and at least one radio network controller (RNC). The antenna is capable of beam-forming and beams emanating from the antenna may be adjusted in accordance with actual conditions in the wireless communication system.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 1:
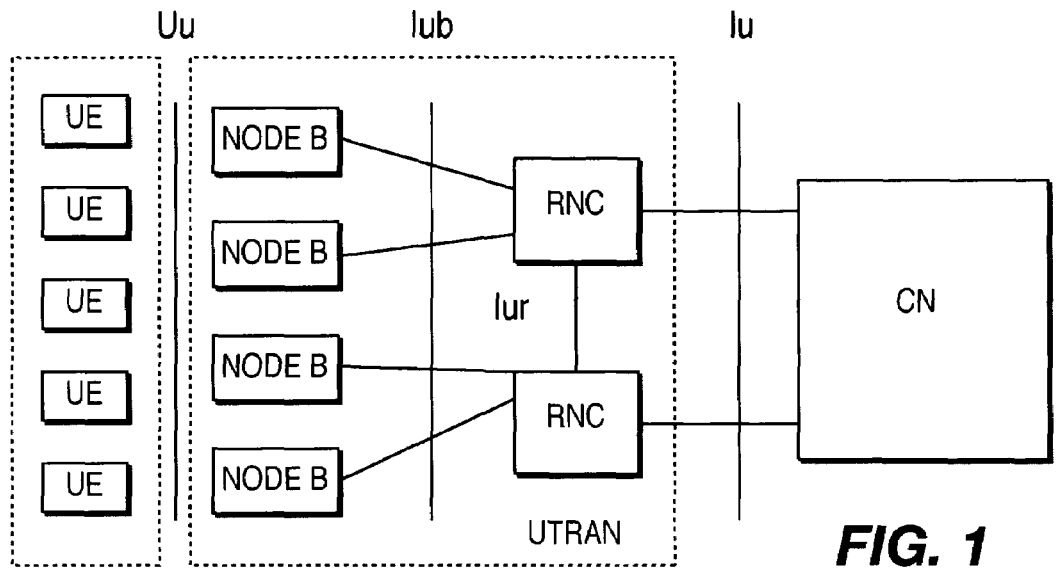
FIG. 1 is a wireless communication system in accordance with current 3GPP specifications.

The preferred embodiments of the present invention will be described with reference to the drawing figures wherein like numerals represent like elements throughout.

Hereafter, a wireless transmit/receive unit (WTRU) includes but is not limited to a user equipment (UE), mobile station, fixed or mobile subscriber unit, pager, or any other type of device capable of operating in a wireless environment. Each of these terms may be used interchangeably herein. When referred to hereafter, a Node B includes but is not limited to a base station, site controller, access point or any other type of interfacing device in a wireless environment. Each of these terms may be used interchangeably herein. The terms antenna and antenna array may also be used interchangeably herein to refer to an antenna capable of beam forming.

Figure 3:
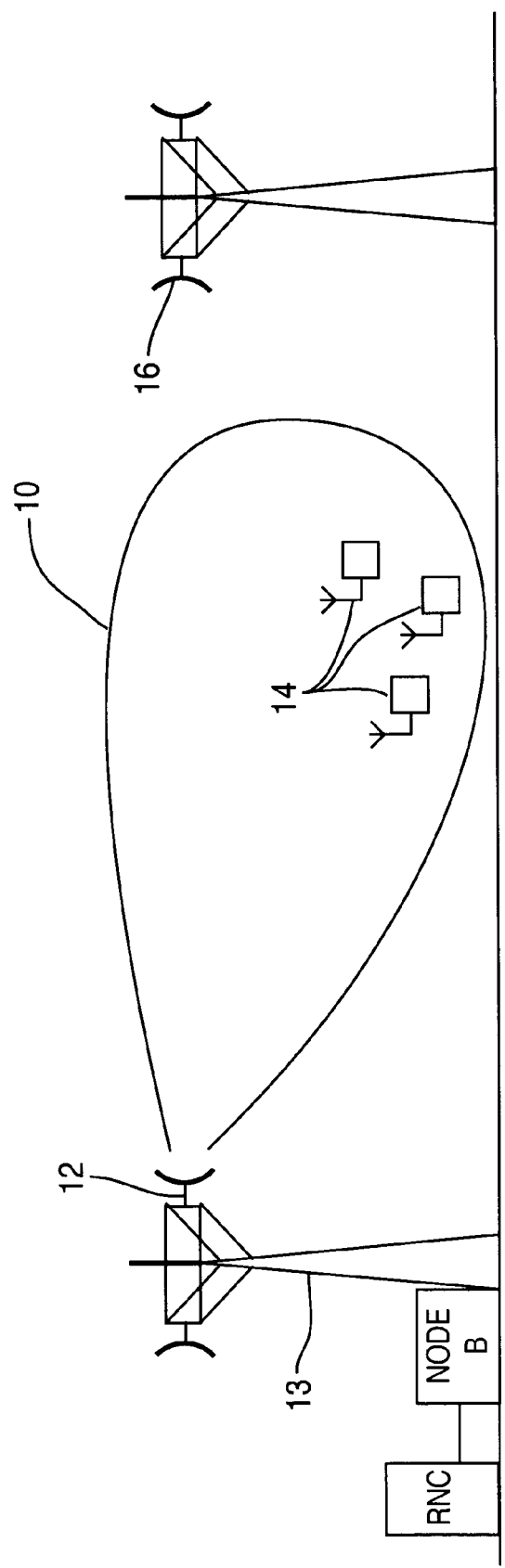
FIG. 3 is a conventional wireless communication system wherein a beam is being transmitted and/or received from a Node B to a plurality of WTRUs.

Referring initially to FIG. 3, there is shown a prior art system wherein a beam 10 is directed from an antenna 12 towards a plurality of WTRUs 14. The energy of the beam 10 does not stop at the contour shown, but actually extends further out with decreasing power density. Therefore, even with a beam-forming antenna 12, the beam 10 still encompasses the neighboring cell thereby causing interference to a neighboring antenna 16. That is, when the beam 10 is a transmit beam, antenna 16 will receive interference from antenna 12. Similarly, when the beam 10 is a receive beam, any transmission from antenna 16 contributes to the noise seen by antenna 12.

Figure 4:
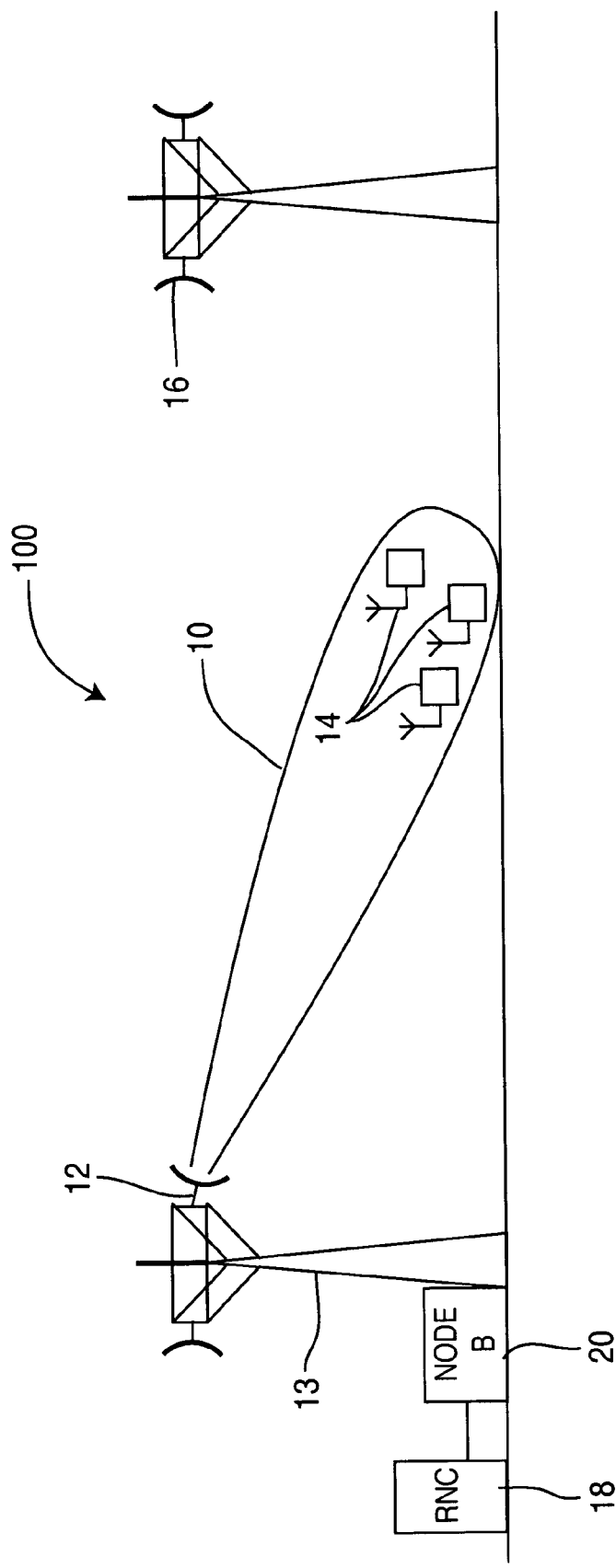
FIG. 4 is a wireless communication system wherein a beam may be dynamically adjusted in at least a vertical dimension in accordance with the present invention.

Referring now to FIG. 4, a system 100 according to the present invention is shown. In the system 100, a beam 10 is dynamically tilted downward approximately as shown. By dynamically tilting the beam 10 downward, the beam 10 is not directed towards the neighboring antenna 16 as in FIG. 3, but still encompasses the WTRUs 14 with a contour that is adequate for communication. Dynamically tilting the beam 10 downward will not completely eliminate interference from or to antenna 16, but will greatly reduce it. In many cases, the down tilt will actually direct the beam 10 into the surrounding surface after it encompasses the WTRUs 14. With respect to transmission, this means that a fraction of the energy of a beam will often be absorbed by the surface, and another fraction will be scattered from the original directional path. The overall effect of this is that the energy at any point past the impact area is a lot less than if the beam had propagated past that point in free air. With respect to reception, this means that the extended beam volume of space will be mostly receiving from a very low source of noise.

System 100 includes at least one radio network controller (RNC) 18, at least one Node B 20, at least one beam forming antenna 12, and a plurality of WTRUs 14. The effective height of antenna 12 may be any height, as desired. Furthermore, the effective height of the antenna 12 may be defined according to operator preference, again as desired. For example, in one embodiment, the effective height of antenna 12 is preferably at least twenty (20) feet wherein the effective height is defined as the height of the antenna 12 above sea level minus the average level of ground within a predetermined geographical area encompassing the antenna 12.

The determination of when to tilt and the computation of the desired tilt information may be done at the RNC 18 or Node B 20, but is preferably performed at the RNC 18. It is preferable to perform these functions at the RNC 18 because the RNC 18 has knowledge regarding all of the Node Bs it is responsible for controlling. The RNC 18 can therefore determine when to tilt and, if appropriate, compute desired tilt information dynamically (i.e. in real time) based on, at least in part, the affect tilting a particular beam 10 may have on antenna 12 and/or other antennas controlled by the RNC 18. This also enables not only information from the RNC 18, but also information from WTRUs 14 to be used when computing tilt information. The determination of when to tilt is based on operator preference. By way of example, the determination of when to tilt may be based on channel usage, capacity power levels, distances between cell sites and WTRUs, device sensitivities, the ability or lack thereof of adjacent cell sites to tilt beams, and other sources of interference which the network has no knowledge and/or control over.

Performing the determination of when to tilt and the computation of the desired tilt information at the RNC 18 or Node B 20 depends on, at least in part, timing considerations. That is, if the reaction time between issuance of tilt information and actual tilting of a beam is measured in less than a few tenths of a second, the determination and computation should typically be done at the Node B 20. To allow for reaction discrepancies between issuance of tilt information at the RNC 18 and Node B 20, a preferred embodiment is to allocate general resources and adjustment limits at the RNC 18 in a slow mode, leaving the Node B 20 free to allocate and adjust the beam 10 in a fast mode within the limits set by the RNC 18. This type of arrangement is currently used with respect to frequency allocation wherein an RNC allocates available frequencies to each Node B controlled by the RNC. The Node Bs are then free to utilize their allocated frequencies as they deem best, subject to any reallocations performed by the RNC based on the RNC's overall view of the Node Bs under its control.

An example of desired tilt information provided by an RNC 18 to a Node B 20 in accordance with the preferred embodiment may be as follows. Bore axis Horizontal between 15 and 40 degrees North; bore axis Vertical between 15 degrees above and 30 degrees below horizontal; beam width between 180 and 20 degrees; and power between 0 and −30 dB. Alternatively, some of the limits may be algorithmically derived based on other constraints. For example, the power limit provided by an RNC 18 may be calculated as a function of vertical beam width, horizontal beam width, vertical beam bore angle, distance between transmitter and receiver, and reported received power.

The circuitry for controlling the tilting of a beam 10 in accordance with the desired tilt information may be located in close proximity to the antenna 12 or some distance away. Where the tilt-control circuitry is located in close proximity to the antenna 12, the desired tilt information may be sent directly to the local circuitry of the antenna 12. Where the tilt-control circuitry is remotely located at the Node B 20, for example, the desired tilt information is sent to the Node B 20 wherein signals for adjusting the beam 10 according to the desired tilt information are generated and transmitted to antenna 12.

Whether the control circuitry is located locally or remotely with respect to antenna 12 is a tradeoff of many factors and is based purely on operator preference. For example, sending the desired tilt information directly to the local circuitry of the antenna 12 allows the control signals to be locally generated, which tend to be more precise and faster acting. This arrangement is harder to maintain, however, since access to the top of the tower 13 is required every time physical access to the local circuitry is required. Where the control circuitry is remotely located with respect to the antenna 12 (e.g. at the Node B), the circuitry is easier to access, but requires means for transmitting appropriate control signals between the Node B 20 and the antenna 12. For example, multiple cables or a single cable as well as multiplexing encoding and decoding circuitry may be provided.

The actual adjustment of a beam in the vertical dimension is done by adjusting the beam's boresight. The beam boresight may be adjusted by mechanical means, electronic/electrical means, or a combination thereof. A beam's boresight may be adjusted mechanically by adjusting the physical radiating elements, reflectors, or parasitic elements of an antenna 12, as understood by those skilled in the art. A beam's boresight may be adjusted electronically by adjusting the phase and amplitude of signals emanating from an antenna 12, as also understood by those skilled in the art.

Figure 6:
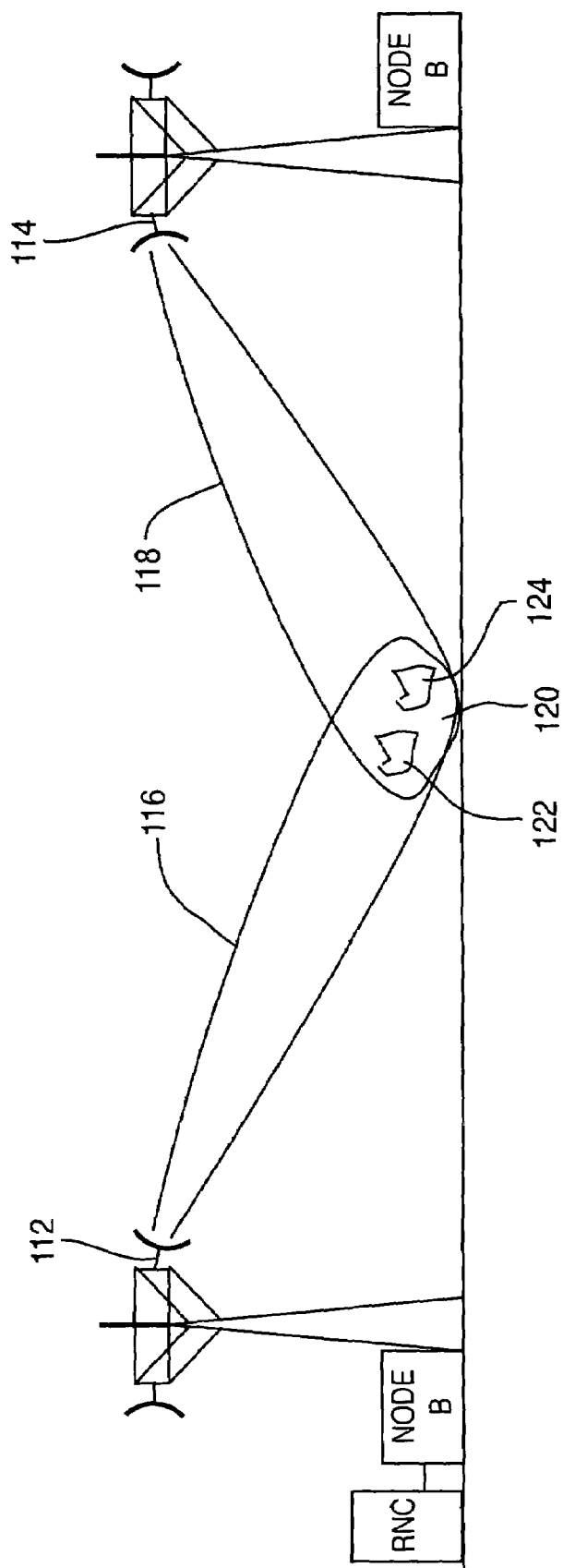
FIG. 6 is a schematic illustration of two transmission beams that overlap in at least a vertical dimension having null areas therein.
Figure 7:
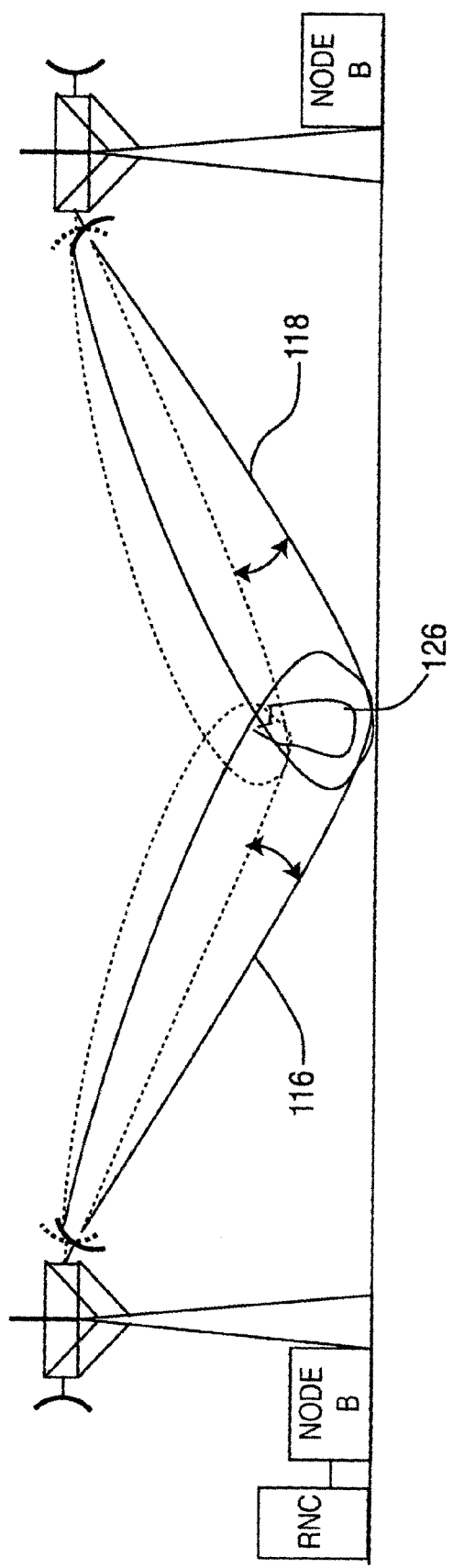
FIG. 7 is a schematic illustration of two transmission beams being dithered in at least a vertical dimension to break up null areas.

As mentioned above, a combination of mechanical and electronic/electric boresight adjusting may be utilized as desired. For example, mechanical adjustment may be used for large scale coarse usage and electronic/electrical adjustment for smaller scale finer adjustments. It is also possible that one type of adjustment is performed in the horizontal dimension and another in the vertical dimension. The type of adjustment utilized to adjust the beam 10 in accordance with the desired tilt information provided by the RNC 18 or Node B 20 is based on operator preference. Regardless of the type of adjustment that is used, appropriate control signals for implementing the desired tilt information are sent to the antenna 12 so that the boresight of the beam is adjusted in accordance with the tilt information generated at the RNC 18 or Node B 20. It is important to note, therefore, that although mechanical means are shown in FIGS. 4, 6, and 7 and electronic/electrical means are shown in FIGS. 5, 8, 9, and 10, this is purely for purposes of describing the invention as either mechanical, electronic/electrical or a combination thereof may be used in any implementation of the present invention.

Dynamically tilting a beam 10 in a vertical direction allows the beam 10 to be made narrower in the vertical dimension, as can be seen by comparing beam 10 in FIGS. 3 and 4. The beam narrowing is done by adjusting the phase and magnitude emanating from an antenna array in the vertical dimension.

A beam that is narrower in the vertical dimension results in additional noise benefits in the transmit and receive operations. That is, as with the horizontal dimension, any restriction of the beam in the vertical space is beneficial with respect to transmission and reception. With respect to receivers, a smaller beam means less receivers will be subject to interference emanating from the beam. With respect to transmitters, a smaller beam means lower transmission power is necessary to achieve the same power density in the region of the intended receiver. A smaller beam also results in fewer multipaths occurring in terrains that are prone to multipath.

It should be noted that in some circumstances it is actually desirable to receive multiple multipaths from the same source (i.e. where the reduction of multipath is not a desirable result). Such cases are, for example, when the power level necessary to decode the signal is insufficient from one path, and/or the multipath provides an improvement in signal robustness because not all of the paths are simultaneously disturbed by signal fading. This utilization is often referred to as spatial diversity transmission when purposely performed at transmitters, and spatial diversity reception when purposely performed at receivers. It should further be noted that beamforming can still be useful in these cases by monitoring the several most significant paths and either switching between or combining them for decoding. This can be done by generating multiple receive beams or widening a single beam to intercept the multipath beams.

Figure 5:
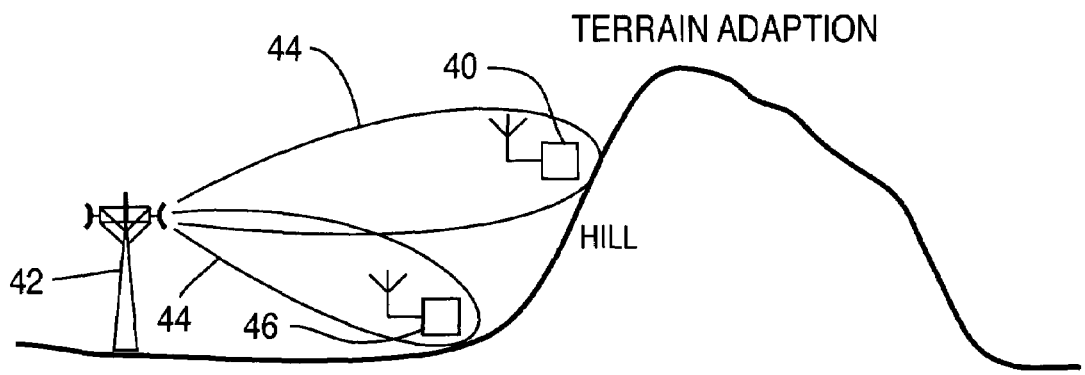
FIG. 5 is a beam being dynamically adjusted in a vertical dimension to accommodate changes in elevation of WTRUs.

Referring now to FIG. 5, another utilization of dynamic vertical beam forming is shown. In this embodiment, beams may be adjusted up or down to compensate for differences in the elevation of WTRUs. By vertically adjusting the beam, the communication link with the target (receiving or transmitting) can be made more robust, and with less interference with other devices.

By way of example, when a WTRU 40 is at a high elevation with respect to an antenna 42, a beam 44 may be dynamically tilted upward so that the beam's contour is directed toward the WTRU 40. Similarly, when a WTRU 46 is at an elevation that is lower than that of the antenna 42, the beam 44 may be dynamically tilted downward.

Referring now to FIGS. 6 and 7, another embodiment of the present invention is to utilize dynamic tilting of beams to dither beams (i.e. dithering) in the vertical dimension so as to break up null areas. In FIG. 6, portions of normalized power patterns from two antennas 112, 114 (i.e. plural transmitters) are shown. In this embodiment, the two antennas 112, 114 belong to separate Node Bs and are transmitting signals, represented by radiation beam patterns 116, 118, with an overlap region 120 of their beams. It is understood that the depicted patterns are of a given field signal intensity and are not nearly as sharply defined as depicted. The majority of the interference between the beams (overlapping region 120) does not lead to a WTRU in the area being unable to receive the signal in a decodable fashion. If the timing is correct and the error-correcting capability of the codes used in the data streams is robust enough, the WTRUs in most if not all of an overlapping region will be able to decode the transmission. Areas 122, 124, however, are places where the interference does not allow robust decoding (i.e. null areas).

The significant aspect of this situation is that some WTRUs may be in positions, such as 122 and 124, where the interference of the signals does not allow decoding of the transmission. Depending on the nature of the transmission, some WTRUs would just miss the signal. Others would interrogate the system later to see if they had missed some message, and if so request its retransmission uniquely to them.

FIG. 7 shows the effect of the two signals 116, 118 being dithered in a vertical dimension. Note, however, that a single beam or, where additional beams are present, any number of beams may be dithered, as desired. Dithering the beams 116, 118 in the vertical dimension has the effect of moving the nulls 122, 124 around within area 126. A WTRU within a null area 122, 124 would therefore not statically remain within the null area 122, 124. Instead, the instantaneous nulls 122, 124 are now being moved over a larger physical area 126, but with a lower duration. It is important to note that, as discussed above, a signal may be dithered electronically/electrically using boresight control, amplitude control, or a combination of amplitude control and boresight control.

It should be noted that null areas may also occur not because of signals emanating from two separate antennas, but from a single antenna whose signal is subject to multipath. That is, in the case of multipath, one or more of the multipath signals may overlap the original signal thereby causing null areas within an overlapping region. In this situation, the beam may dithered in the vertical direction to move the null areas around to reduce the likelihood that WTRUs remain within a null area for a period of time that is sufficient to affect transmission.

Figure 8:
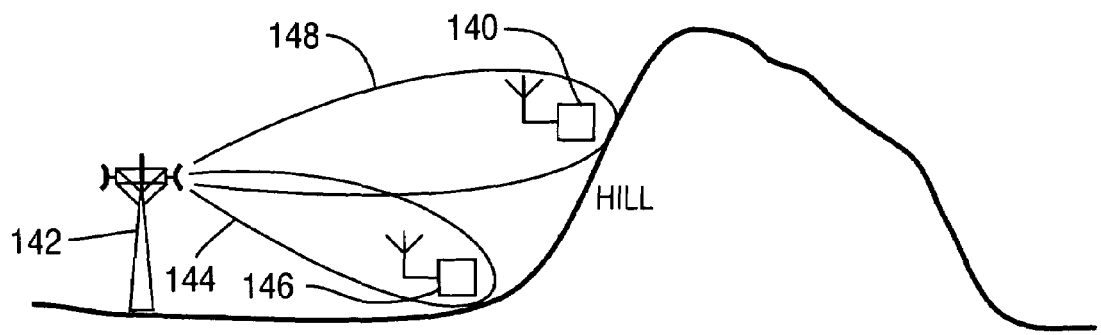
FIG. 8 is a beam being dynamically adjusted in at least a vertical dimension to provide spatial multiplexing.
Figure 2A:
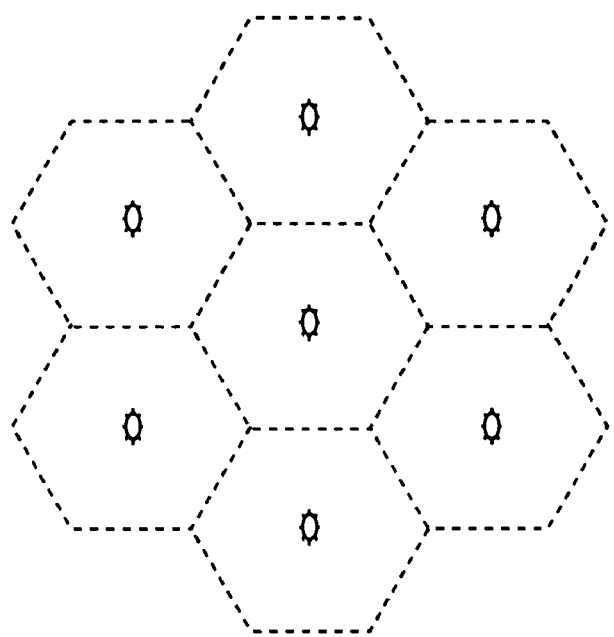
FIG. 2A is a geographic coverage area of a telecommunication system wherein the geographic area is partitioned into a predefined pattern of hexagonal-shape cells.
Figure 2B:
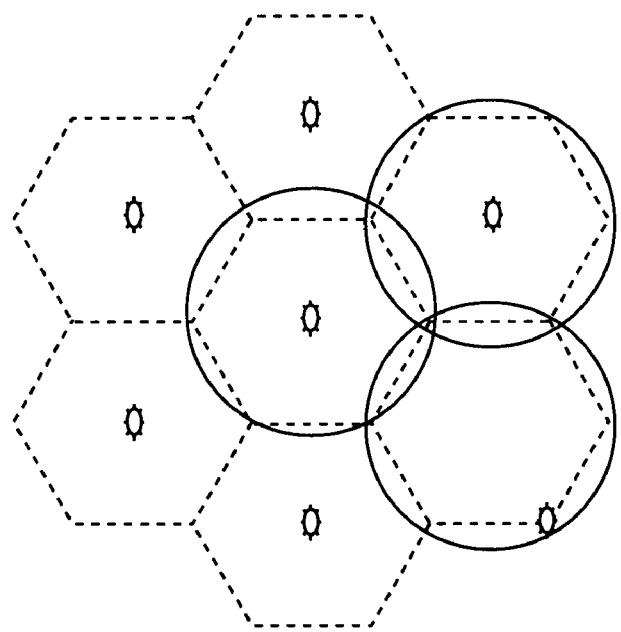
FIG. 2B is a geographic coverage area of a telecommunication system wherein the transmission and/or receiver beams of adjacent cells overlap.

Referring now to FIG. 8, another embodiment of the present invention is to dynamically adjust beams in a vertical dimension to achieve spatial multiplexing. Spatial multiplexing is the transmission of multiple different signals sent along multiple different paths to multiple different WTRUs. For example, in FIG. 8, antenna 142 is transmitting multiple signals 148, 144 each having their own path. Signal 148 is transmitted to WTRU(s) 140 and signal 144 is transmitted to WTRUs 146. In this embodiment, the beams are preferably narrowly tailored so as to reduce the amount of interference caused by signal 148 to signal 144, and vice versa.

Figure 9:
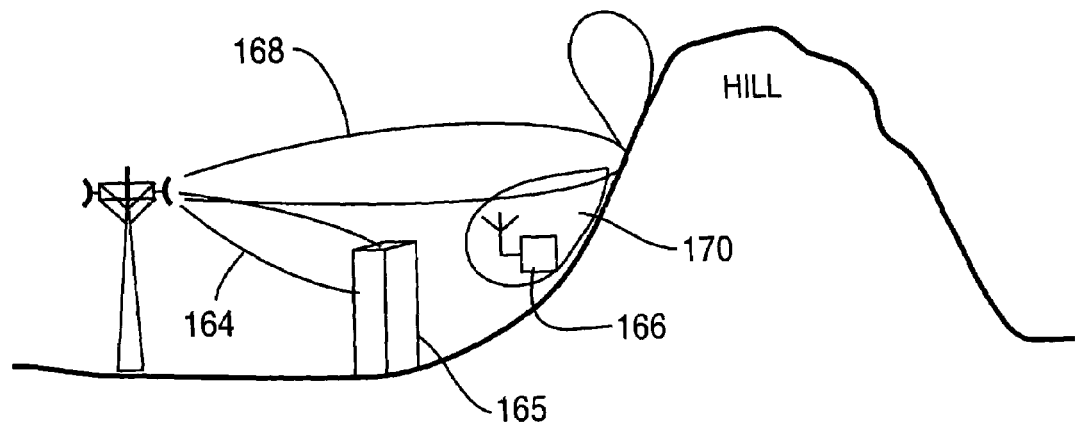
FIG. 9 is a beam being dynamically adjusted in at least a vertical dimension to provide spatial and time diversity.

Referring now to FIG. 9, another embodiment of the present invention is to dynamically adjust beams in a vertical dimension to achieve spatial diversity. Spatial diversity is the transmission of a single signal sent over multiple different paths to the same WTRU or group of WTRUs in a particular area. For example, if a building structure 165 is located in front of WTRU 166 that is high enough to block path 164, but not path 168, WTRU 166 can still receive the signal from a reflection 170 of path 168 or of some other path, as the signal may be sent along any number of paths as desired. The greater number of paths on which the signal is transmitted, the greater the odds that a reflected signal will reach the receiving WTRU(s) 166. Spatial diversity may be performed with two or more beams transmitted in the same time frame, or in different time frames as desired. The former is a more efficient utilization of the RF resource in time, but requires more equipment. Which is used is therefore a tradeoff of cost versus system capacity.

Figure 10:
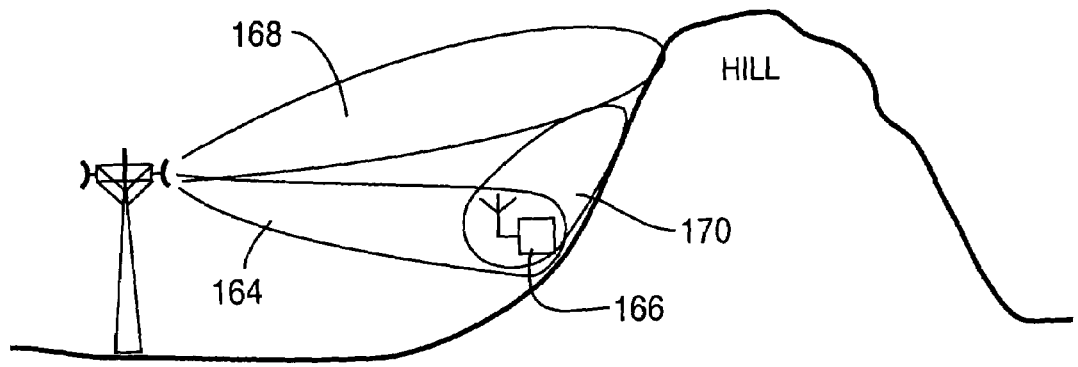
FIG. 10 is a pair of beams being dynamically adjusted in at least a vertical dimension at the same time to provide spatial layering.
Figure 1:
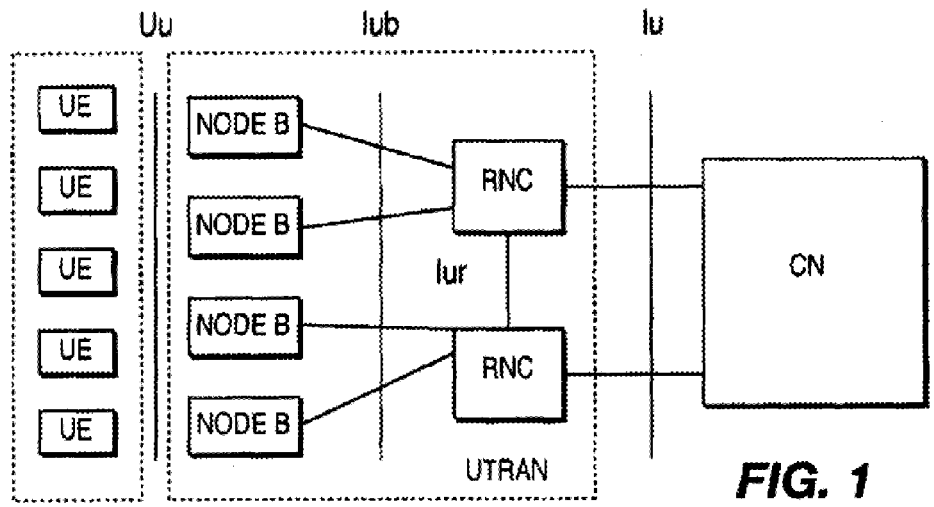
Figure 5:
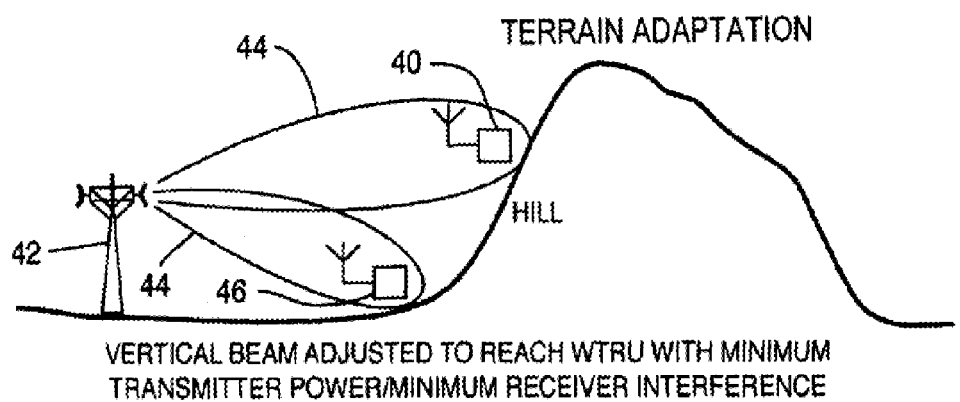
Figure 8:
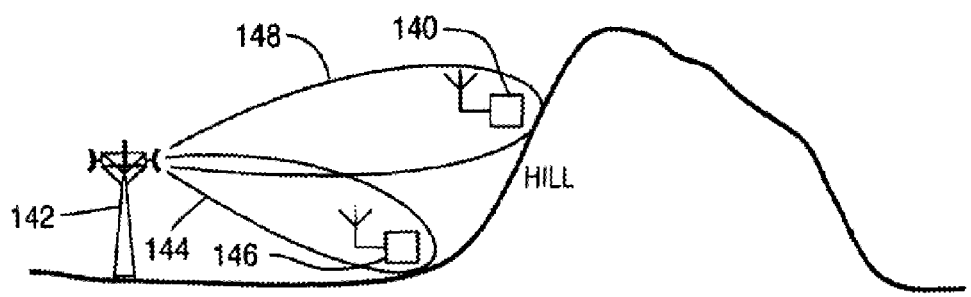

Referring now to FIG. 10, another embodiment of the present invention is to dynamically adjust beams in a vertical dimension to achieve spatial layering. Spatial layering is the transmission of multiple different signals directed via reflection or refraction (e.g. around corners) to a single geographical location so that WTRU(s) capable of decoding multiple transmissions within that geographical area may receive the signals at a higher data rate than if the date were sent in a single signal. For example, if WTRU 166 is receiving a large transmission, the data contained in that transmission can be broken down into one or more signals 168, 164, as desired. In this case, one signal 164 may be directed directly toward the geographical area in which WTRU 166 is located, but any number of additional signals 168 may be transmitted so that their reflected signal(s) 170 reach that same area. This greatly increases the data rate at which WTRU 166 can receive the transmission.

It should be noted that dynamic vertical tilting of antennas and beams as described herein may be implemented alone or in conjunction with horizontal adjustments of antennas and beams. Furthermore, vertical tilting as described herein may be performed, for example, with switched beams (i.e. beams having a finite number of positions) and adaptive beams (i.e. beams wherein the boresight of the beam is continuously updated to be in an optimal position as determined by the RNC).

Although the preferred embodiments are described in conjunction with a third generation partnership program (3GPP) system, the embodiments are applicable to any wireless communication system utilizing beam forming.

While the present invention has been described in terms of the preferred embodiment, other variations, which are within the scope of the invention as outlined in the claims below will be apparent to those skilled in the art.

What is claimed is:

1. A wireless communication system for transmitting and receiving wireless communications using at least one beam comprising:
    a plurality of wireless transmit/receive units (WTRUs);
    at least one base station having at least one beam forming antenna wherein at least one beam emanating from the beam forming antenna may be dynamically adjusted in at least a vertical dimension; and
    a radio network controller (RNC) configured to generate tilt information for dynamically tilting at least one beam considering an effect that tilting a beam may have on other base stations to optimize transmission and allow for reaction discrepancies between the base station and at least one WTRU.

2. The wireless communication system of claim 1 wherein the beam is further dynamically adjusted in a horizontal dimension.

3. The wireless communication system of claim 1 wherein the base station generates control signals for dynamically adjusting the beam in accordance with the tilt information provided by the RNC.

4. The wireless communication system of claim 1 wherein the RNC generates control signals for dynamically adjusting the beam based on the tilt information.

5. The wireless communication system of claim 1 wherein the beam is tilted downward to reduce interference to and from another base station.

6. The wireless communication system of claim 1 wherein the beam is dynamically adjusted to account for variations in elevation between the WTRUs.

7. The wireless communication system of claim 1 wherein the beam is dynamically adjusted to break up null areas wherein transmission signals are not decodable.

8. The wireless communication system of claim 7 wherein the beam is adjusted by dithering the beam in at least a vertical dimension.

9. The wireless communication system of claim 7 wherein the beam is adjusted by dithering the beam in a vertical and horizontal dimension.

10. The wireless communication system of claim 1 wherein the beam is adjusted to provide multiple signals along multiple paths to increase the data rate at which a receiving WTRU may receive data contained within the signals.

11. A method for dynamically adjusting beams to optimize transmissions within a wireless communication system, the method comprising:
    a radio network controller (RNC) computing tilt information in real-time based on actual conditions in a wireless communication system considering an effect that tilting a beam may have on other base stations under the control of the RNC;
    a radio network controller (RNC) allocating general resources and adjustments permitting reaction discrepancies between the issuance of tilt information at the RNC and a base station; and
    a base station adjusting at least one beam in at least a vertical dimension based on the tilt information.

12. The method of claim 11 wherein the tilt information is computed to adjust the beam to minimize interference to and from another antenna.

13. The method of claim 11 wherein the tilt information is computed to adjust the beam to account for variations in elevation of WTRUs.

14. The method of claim 11 wherein the tilt information is computed to dither the beam to break up null areas wherein transmission signals are not decodable.

15. A wireless communication system for transmitting and receiving wireless communications using at least one beam comprising:
    a plurality of wireless transmit/receive units (WTRUs);
    a radio network controller (RNC);
    at least one base station having at least one beam forming antenna wherein a beam emanating from the beam forming antenna may be dynamically adjusted in at least a vertical dimension based on tilt information which is generated by considering an affect that tilting a beam may have on other base stations to optimize transmission and allow for reaction discrepancies between the base station and at least one WTRU.

16. The wireless communication system of claim 15 wherein information from the radio network controller and the plurality of WTRUs is used to compute the tilt information for dynamically adjusting the beam.

* * * * *

UNITED STATES PATENT AND TRADEMARK OFFICE
CERTIFICATE OF CORRECTION

| | |
|---|---|
| PATENT NO. | : 7,236,808 B2 |
| APPLICATION NO. | : 10/656495 |
| DATED | : June 26, 2007 |
| INVENTOR(S) | : Steven Jeffrey Goldberg |

It is certified that error appears in the above-identified patent and that said Letters Patent is hereby corrected as shown below:

ON THE TITLE PAGE

At section (56), OTHER PUBLICATIONS, page 2, right column, line 7, before the words "United Kingdom", delete "Biringham" and insert therefor --Birmingham--.

At section (56), OTHER PUBLICATIONS, page 2, right column, line 21, before the words "United Kingdom", delete "Biringham" and insert therefor --Birmingham--.

IN THE DRAWINGS

At FIG. 5, caption at top, delete "TERRAIN ADAPTION" and insert therefor --TERRAIN ADAPTATION--. As shown in attached

IN THE SPECIFICATION

At column 1, line 54, before the words "the radio", delete "control" and insert therefor --controls--.

At column 2, line 6, after the word "serving", delete "networks" and insert therefor --network's--.

At column 2, line 8, after the word "administers", insert --to--.

At column 8, line 45, before the word "dithered", insert --be--.

UNITED STATES PATENT AND TRADEMARK OFFICE
CERTIFICATE OF CORRECTION

PATENT NO. : 7,236,808 B2
APPLICATION NO. : 10/656495
DATED : June 26, 2007
INVENTOR(S) : Steven Jeffrey Goldberg It is certified that error appears in the above-identified patent and that said Letters Patent is hereby corrected as shown below:

IN THE SPECIFICATION (continuted)

At column 9, line 20, before the word "were", delete "date" and insert therefor --data--.

Signed and Sealed this

Twenty-ninth Day of January, 2008

JON W. DUDAS
*Director of the United States Patent and Trademark Office*

TERRAIN ADAPTATION

VERTICAL BEAM ADJUSTED TO REACH WTRU WITH MINIMUM
TRANSMITTER POWER/MINIMUM RECEIVER INTERFERENCE